United States Patent
Lee et al.

(10) Patent No.: US 7,554,945 B2
(45) Date of Patent: Jun. 30, 2009

(54) APPARATUS AND METHOD FOR RECEIVING DATA IN A MOBILE COMMUNICATION SYSTEM

(75) Inventors: Dong-Jun Lee, Suwon-si (KR); Sung-Kwon Jo, Suwon-si (KR); Ji-Won Lee, Seongnam-si (KR); Ki-Seob Hong, Suwon-si (KR); Yun-Seok Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 603 days.

(21) Appl. No.: 11/416,246

(22) Filed: May 3, 2006

(65) Prior Publication Data

US 2006/0251016 A1 Nov. 9, 2006

(30) Foreign Application Priority Data

May 6, 2005 (KR) ...................... 10-2005-0038018

(51) Int. Cl.
*H04W 4/00* (2009.01)
(52) U.S. Cl. ...................... 370/329; 455/574; 370/311; 370/342
(58) Field of Classification Search ................. 370/329, 370/311; 455/572, 574, 343.1–343.4; 713/300, 713/320, 324
See application file for complete search history.

(56) References Cited

U.S. PATENT DOCUMENTS 5,151,919 A * 9/1992 Dent .......................... 370/209
6,512,931 B1 * 1/2003 Kim et al. ................... 455/522

* cited by examiner

*Primary Examiner*—Rafael Pérez-Gutiérrez
*Assistant Examiner*—Munjal Patel
(74) *Attorney, Agent, or Firm*—Roylance, Abrams, Berdo & Goodman, L.L.P.

(57) ABSTRACT

An apparatus and method for receiving data in a mobile station for a mobile communication system using multi-user packet data are provided, in which a preamble power measurer measures preamble power of the multi-user packet data received from a base station and transmits the result value to a controller. The controller compares the measured power with a predetermined threshold, simultaneously decodes the multi-user packet data according to all transport formats if the measured power is lower than the threshold, and decodes the multi-user packet data according to a predetermined transport format if the measured power is higher than or equal to the threshold. A plurality of decoders decode the received multi-user packet data according to a control signal from the controller, wherein the number of the decoders depends upon the total number of transport formats for the multi-user packet data.

12 Claims, 6 Drawing Sheets

(RELATED ART)

APPARATUS AND METHOD FOR RECEIVING DATA IN A MOBILE COMMUNICATION SYSTEM

PRIORITY

This application claims the benefit under 35 U.S.C. § 119 (a) of a Korean Patent Application filed in the Korean Intellectual Property Office on May 6, 2005 and assigned Serial No. 2005-38018, the entire disclosure of which is hereby incorporated by reference.

BACKGROUND OF THE INVENTION

1. Field of the Invention

The present invention relates generally to an apparatus and method for receiving data in a mobile communication system. More particularly, the present invention relates to an apparatus and method for receiving packet data in a mobile communication system.

2. Description of the Related Art

Mobile communication systems have been developed to provide voice service, while guaranteeing mobility of the users. With the rapid development of communication technologies, the mobile communication systems can now support data service. Recently, many researches are being conducted for high-speed data transmission in a Code Division Multiple Access (CDMA) mobile communication system. A CDMA2000 1x Evolution Data Only (1xEV-DO) system is a typical mobile communication system having a channel structure for the high-speed data transmission. The CDMA2000 1xEV-DO system has been proposed in Third Generation Partnership Project 2 (3GPP2) to make up for defects of data communication in the IS-2000 system.

In the 1xEV-DO system, data communication can be divided into data communication in a forward direction and data communication in a reverse direction. Herein, the term "forward direction" refers to a direction from an access network (or base station) to an access terminal (or mobile station), and the term "reverse direction" refers to a direction from an access terminal to an access network.

To maximize forward transmission power, the 1xEV-DO system generally has an architecture in which an access terminal measures minimum Carrier-to-Interference ratio (C/I), which is a forward channel environment parameter, and an access network transmits data using a Data Rate Control (DRC) value, which is a forward data rate determined by the access terminal.

Figure 1:
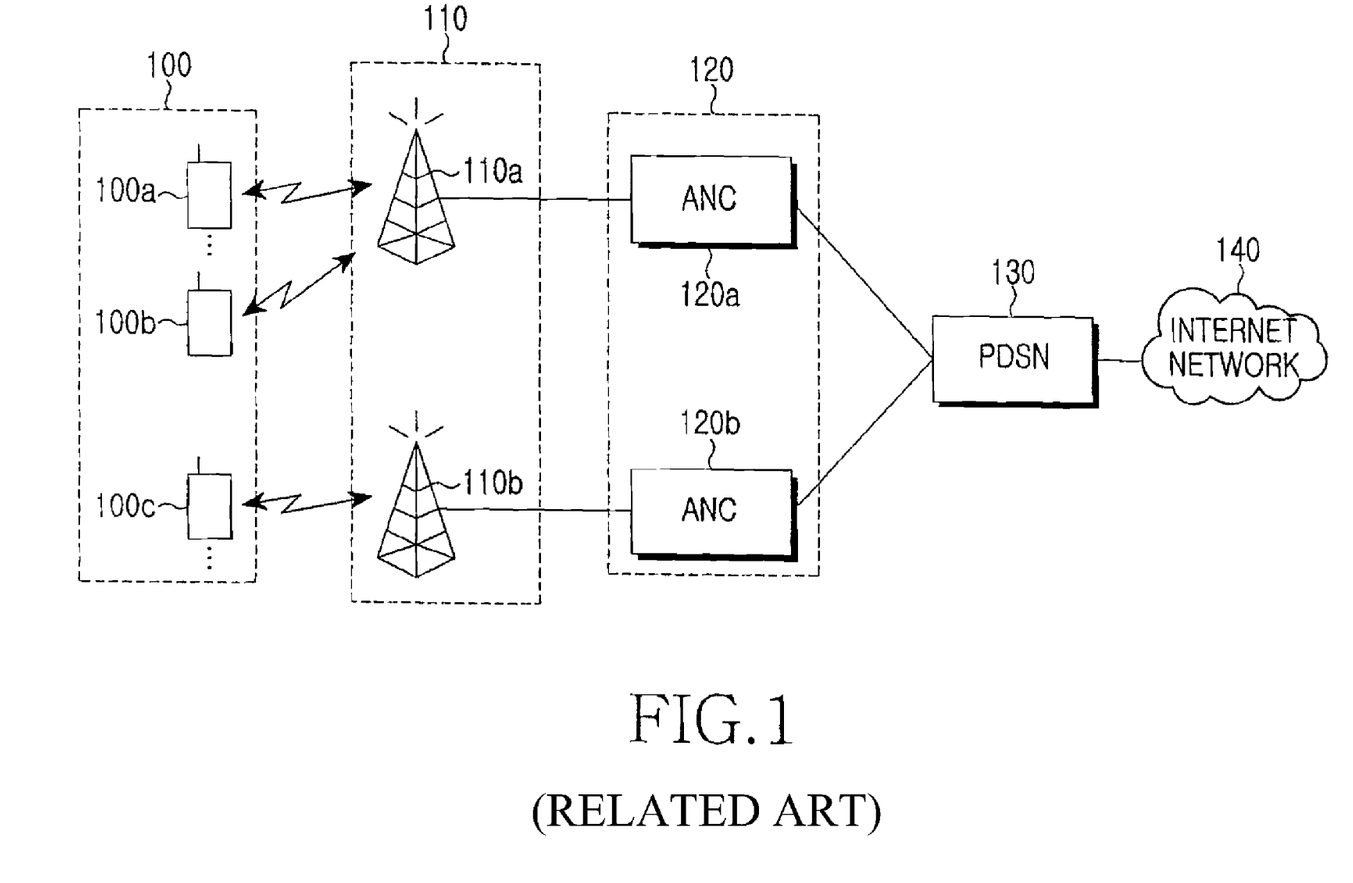
FIG. 1 is a diagram schematically illustrating a general CDMA2000 1xEV-DO system.

FIG. 1 is a diagram schematically illustrating a general CDMA2000 1xEV-DO system. Reference numeral 100 denotes access terminals (ATs), reference numeral 110 denotes access networks (ANs, also known as an access points (APs)), and reference numeral 120 denotes access network controllers (ANCs). A brief description will now be made of the system architecture. A first AN 110a is shown to perform communication with a plurality of ATs 100a and 100b, and a second AN 110b is shown to perform communication with another AT 100c. The first AN 110a is connected to a first ANC 120a, and the second AN 110b is connected to a second ANC 120b. Each of the ANCs 120a and 120b can be connected to two or more ANs. For convenience, it is shown in FIG. 1 that one ANC is connected to one AN. Each of the ANCs 120a and 120b is connected to a Packet Data Service Node (PDSN) 130 that provides packet data service, and the PDSN 130 is connected to an Internet network 140.

In this mobile communication system, each of the ANs 110a and 110b transmits packet data only to the AT having the highest packet data rate among the ATs communicable therewith, that is, the ATs located in its coverage. A detailed description thereof will now be given. In the following description, an AT will be denoted by reference numeral 100, and an AN will be denoted by reference numeral 110.

For forward channel rate control, an AT 100 measures received power of a pilot channel transmitted by an AN 110, and determines a forward data rate desired by ATs 100 according to a predetermined fixed value based on the measured received pilot power. Thereafter, the AT 100 transmits DRC information corresponding to the determined forward data rate to the AN 110 over a DRC channel. Then the AN 110 receives DRC information from all ATs located in its own coverage. Thereafter, based on the DRC information, the AN 110 can transmit packet data to a particular AT having a good channel state at the data rate reported by the AT. Herein, the DRC information refers to a numerical value determined by the AT by measuring its own channel state and determining an available forward data rate depending on the measured channel state. Although a mapping relationship between the forward channel state and the DRC information is subject to change according to implementation, a value fixed in the AT manufacturing process is generally used as the mapping relationship.

The CDMA2000 1xEV-DO system has evolved into a Revision A system. The Revision A system aims at efficiently providing not only high-speed data service but also a service that needs to guarantee Quality-of-Service (QoS), like voice packets. Accordingly, a Multi-User Packet has been newly added in addition to a conventional Single-User Packet as a forward transmission scheme. Multi-User Packet, which has been proposed to prevent unnecessary traffic waste when transmitting data to one AT at a certain time, is designed to transmit packets to a plurality users. A brief description will first be made of frame structure, Single-User Packet and Multi-User Packet in the CDMA2000 1xEV-DO system, and thereafter, a detailed description will be made of a method for determining a data rate in the CDMA2000 1xEV-DO Revision A system.

Figure 2:
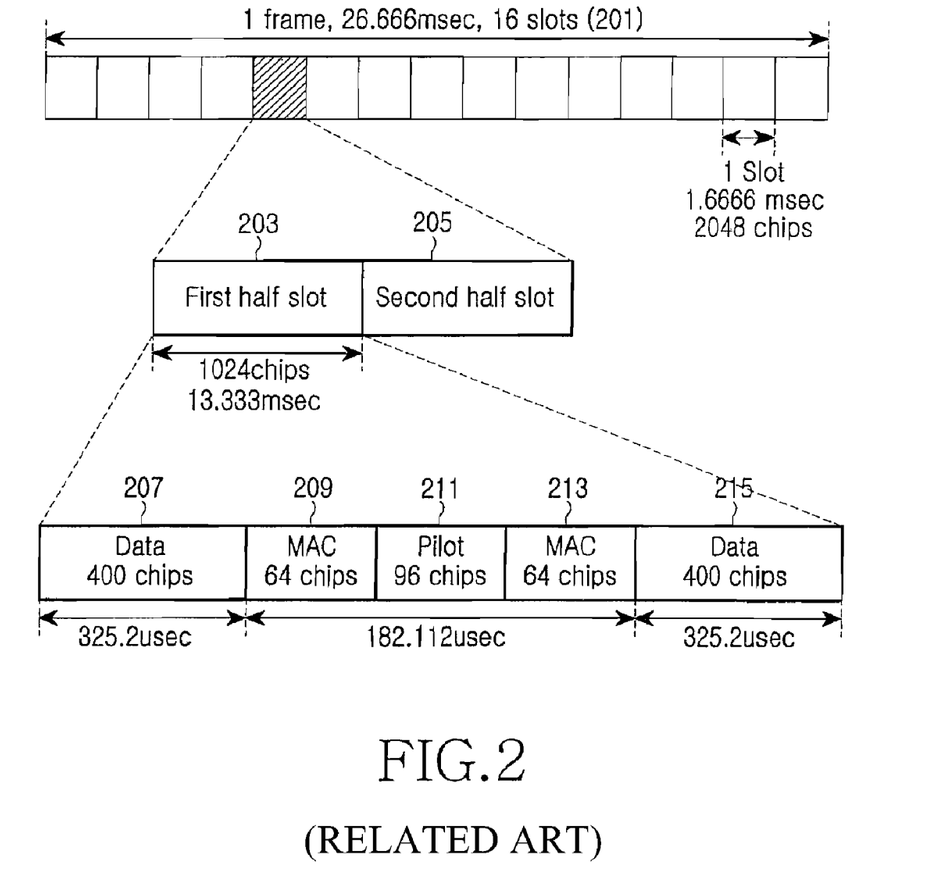
FIG. 2 is a diagram illustrating a frame structure in the general CDMA2000 1xEV-DO system.

FIG. 2 is a diagram illustrating a frame structure in the CDMA2000 1xEV-DO system. Referring to FIG. 2, a frame 201 of a forward channel is comprised of 16 slots and has a length of about 26.666 msec. Each slot of the frame 201 is divided into two half slots 203 and 205 before being transmitted to prevent transmission error. Each of the half slots 203 and 205 has a length of 13.33 msec and is comprised of 1024 chips.

Because the half slots 203 and 205 are identical to each other, only the first half slot 203 will be described. The first half slot 203 is comprised of Medium Access Control (MAC) channels 209 and 213, a Pilot channel 211, and Data channels 207 and 215. The MAC channels 209 and 213 each have a 64-chip length and take charge of controlling radio capacity and controlling transmission power of each AT. The Pilot channel 211 is comprised of 96 chips and used for synchronization, decoding, demodulation and C/I measurement for each AT. That is, the AT determines a rate of forward data from a C/I value of the Pilot channel 211, and sends a request for determined data rate to an AN. Finally, the Data channels 207 and 215 are channels containing actual traffic. Every slot has two Data channels, and each Data channel is comprised of 400 chips. The AN includes preambles in the Data channels 207 and 215 containing actual traffic during initial transmission of each frame.

Next, with reference to FIGS. 3A and 3B, a description will be made of structures of the Single-User Packet and Multi-User Packet for the Data channels 207 and 215. Although the data channels are represented as the different reference number, the data channels can be either a Single-User Packet or a Multi-User Packet.

Figure 3A:
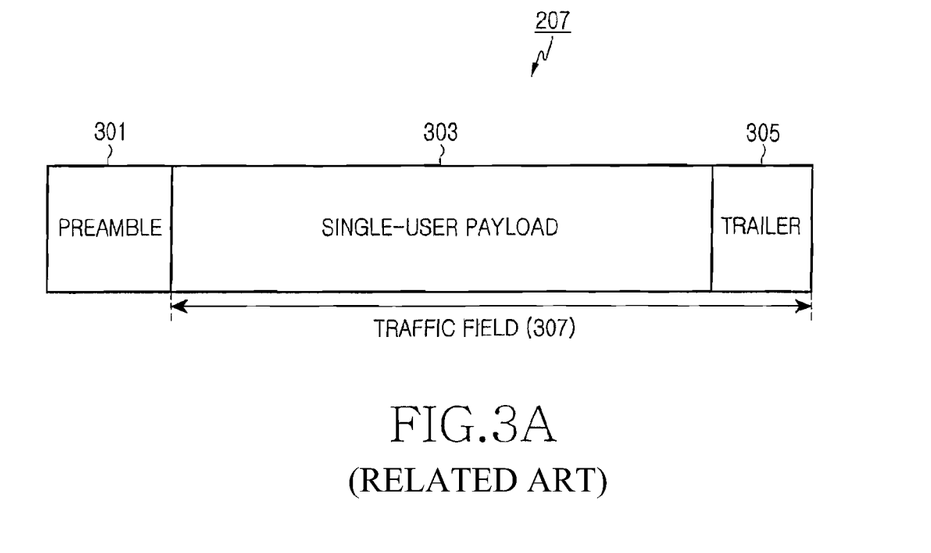
FIG. 3A is a diagram illustrating a format of Single-User Packet data used in the CDMA2000 1xEV-DO system.

FIG. 3A is a diagram illustrating a format of the Single-User Packet data. Referring to FIG. 3A, the Single-User Packet data, which is transmitted when the number of ATs receiving transmission packets from a physical layer is one, is divided into a Preamble 301 and a Traffic field 307. The Traffic field 307 is divided into a Single-User payload 303 and a Trailer 305. The Preamble 301 includes such information as an identifier (ID) of a receiving AT, and the receiving AT determines whether the information is its own information using the Preamble information, and performs demodulation using a transport format corresponding to a DRC value appropriate to itself. The Traffic field 307 includes the traffic to be actually transmitted by the AN, and the Trailer 305 includes a Cyclic Redundancy Code (CRC), and is used for determining whether there is any error in a received signal.

Figure 3B:
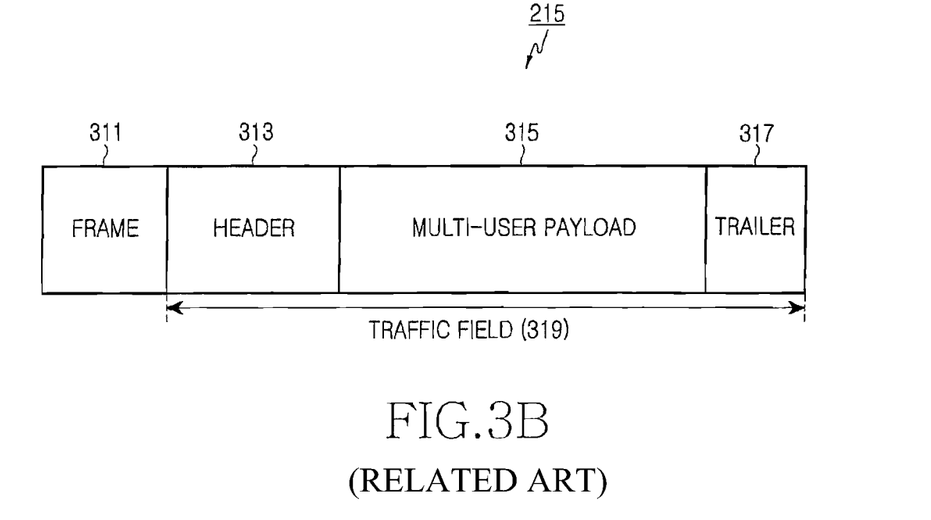
FIG. 3B is a diagram illustrating a format of Multi-User Packet data used in the CDMA2000 1xEV-DO system.

FIG. 3B is a diagram illustrating a format of Multi-User Packet data. Referring to FIG. 3B, the Multi-User Packet data is also divided into a Preamble 311 and a Traffic field 319. The Traffic field 319 is comprised of a Header 313, Multi-User payload 315, and Trailer 317. The Preamble 311 of the Multi-User Packet data, as Multi-User Packet transmits data to a plurality of users using one packet, includes the information indicating whether the currently transmitted packet is a Multi-User Packet based packet, and the packet size information. The information on IDs of several ATs and a number of users are included in the Multi-User payload 315.

Figure 4:
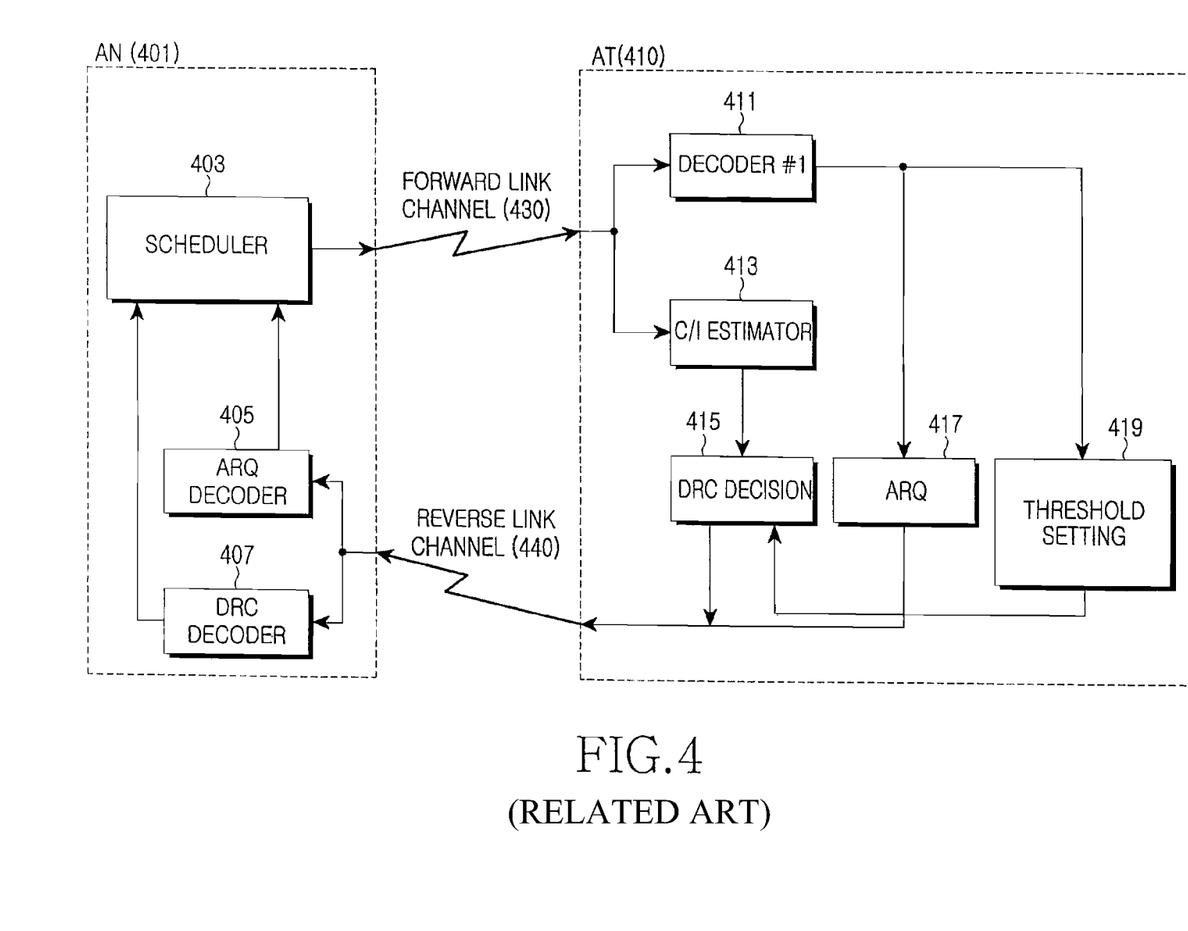
FIG. 4 is a diagram illustrating the connection between an access network (AN) and an access terminal (AT) in the general CDMA2000 1xEV-DO network.

With reference to FIG. 4, a description will now be made of a method for controlling a forward data rate in the CDMA2000 1xEV-DO system employing Single/Multi-User Packet.

FIG. 4 is a diagram illustrating a connection between an AN 401 and an AT 410 in the general CDMA2000 1xEV-DO network. Herein, the AN 401 represents a base station in the general mobile communication system, and the AT 410 represents a mobile station in the general mobile communication system. For convenience, a description of undepicted elements of the AN 401 will be omitted for clarity and conciseness. A brief description will now be made of constituent elements.

Referring to FIG. 4, in the CDMA2000 1xEV-DO system, a decoder 411 and a C/I estimator 413 of the AT 410 receive a signal transmitted through a forward link channel 430. The C/I estimator 413 estimates a C/I value by measuring a pilot value of the received signal. The decoder 411 transmits Packet Error Rate (PER), or Packet Error Event information of the received signal to an Automatic Repeat reQuest (ARQ) unit 417 and a threshold setting unit 419. The ARQ unit 417 provides information indicating whether to perform an ARQ operation to the AN 401 through a reverse link channel 440 according to the PER determined by the decoder 411.

The threshold setting unit 419 sends a threshold to a DRC decision unit 415 so that the DRC decision unit 415 may receive a PER from the decoder 411 and determine a data rate according to the C/I. Thereafter, the DRC decision unit 415 transmits the determined rate information to the AN 401 over the reverse link channel 440 along with an ARQ message.

Then an ARQ decoder 405 and a DRC decoder 407 of the AN 401 decode the ARQ message and DRC information received through the reverse link channel 440, respectively, and transmit the decoded information to a scheduler 403. Thereafter, the scheduler 403 allocates forward resources and performs an operation according thereto.

In a Single-User Packet decoding method, because a preamble of Single-User Packet data includes an ID of a receiving AT, the AT 410 determines whether received information is its own information using the preamble information, and performs decoding using a transport format corresponding to a DRC value transmitted by the AT 410 itself. However, in a Multi-User Packet decoding method, a preamble of Multi-User Packet data includes the information indicating whether the currently transmitted packet is a Multi-User Packet based packet, and the packet size information. Therefore, upon receiving Multi-User Packet data, the AT 410 compares packet size information included in the preamble with payload sizes of transport formats indicating a plurality of Multi-User DRC values mapped to the DRC value transmitted by the AT 410 itself. After checking the preamble, if there is any received data whose payload size is identical to the packet size, all ATs 410 perform decoding according to the transport format using their own decoders 411. That is, the AT should succeed in decoding the preamble in order to determine whether its own information is included in the current packet. However, if there is a preamble error in the Multi-User Packet data, the AT may undesirably decode the traffic field using a misaligned transport format. Therefore, in the preamble check process, even in a possible early termination situation, the AT 410 repeatedly receives data, unnecessarily wasting the radio resources. This causes a reduction of the total system performance.

Accordingly, there is a need for an improved apparatus and method for efficiently receiving packet data in a mobile communication system.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide an apparatus and method for efficiently receiving packet data in a mobile communication system using Multi-User Packet data.

It is another object of exemplary embodiments of the present invention to provide an apparatus and method for increasing a success rate of packet reception in a mobile communication system using Multi-User Packet data.

It is further an object of exemplary embodiments of the present invention to provide a packet data reception apparatus and method for increasing efficiency of radio resources in a mobile communication system using Multi-User Packet data.

According to one aspect of exemplary embodiments of the present invention, there is provided a mobile station for a mobile communication system using multi-user packet data. The mobile station comprises a preamble power measurer for measuring preamble power of the data received from a base station. A controller compares the measured power received from the preamble power measurer with a threshold, transmitting the packet to decoders to simultaneously decode the packet data according to all transport formats, if the measured power is lower than the threshold. A plurality of decoders decoding the received packet data according to a control signal from the controller, wherein a number of the decoders depends upon a total number of transport formats for the packet data.

In an exemplary implementation, the decoder performs error check using a cyclic redundancy code (CRC) after decoding the packet data.

In an exemplary implementation, the mobile station further comprises a switch unit connected to all of the decoders, for switching a decoding path of the received packet data according to the control signal from the controller.

In an exemplary implementation, the mobile station further comprises a threshold setting unit for setting a target threshold for satisfying a predetermined error criterion depending on error information received from the decoder; and a data rate control (DRC) decision unit for determining a DRC value taking into account the target threshold received from the threshold setting unit and a minimum carrier-to-interference ratio (C/I) which is a forward channel environment parameter, and transmitting the determined DRC value to the base station.

In an exemplary implementation, the mobile station further comprises an acknowledgement/negative acknowledgement (ACK/NAK) unit for generating ACK/NAK information indicating success/failure in receiving the packet data and transmitting the ACK/NAK information to the base station.

In an exemplary implementation, the controller performs decoding the packet data according to a predetermined transport format, if the measured power is higher than or equal to the threshold;

According to another aspect of exemplary embodiments of the present invention, there is provided a method for receiving packet data by a mobile station in a mobile communication system using the packet data. The method comprises measuring preamble power of the packet data and comparing the measured preamble power with a predetermined threshold; and if the measured preamble power is lower than the threshold, simultaneously receiving the packet data at a plurality of decoders and performing decoding thereon according to all transport formats.

In an exemplary implementation, if the measured preamble power is higher than or equal to the threshold, the method comprises performing decoding using a predetermined one of the plurality of decoders.

In an exemplary implementation, the method further comprises the step of performing error check on the decoded packet data using a cyclic redundancy code (CRC).

In an exemplary implementation, the method further comprises the step of generating ACK/NAK information indicating success/failure in receiving the packet data and a data rate control (DRC) value according to the error check result, and transmitting the ACK/NAK information and the DRC value to the base station, wherein ACK information is generated if the error check result is good, and NAK information is generated if the error check result is bad.

BRIEF DESCRIPTION OF THE DRAWINGS

The above and other objects, features and advantages of the present invention will be more apparent from the following detailed description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In certain exemplary embodiments of the present invention, an apparatus and method increase the overall service quality and system performance by enabling traffic reception even when an AT cannot perform demodulation due to its failure to demodulate a preamble of received Multi-User Packet data in a system supporting forward transmission using Multi-User Packet in which the AT determines a forward data rate, and based thereon, an AN simultaneously transmits data for several ATs on one packet. That is, an AT increases a reception success rate of Multi-User Packet data regardless of decoding success/failure for a preamble in a CDMA2000 1xEV-DO system using Multi-User Packet, and a packet data reception method therefor.

A description will now be made of a CDMA2000 1xEV-DO system and a packet data reception method thereof.

Figure 5:
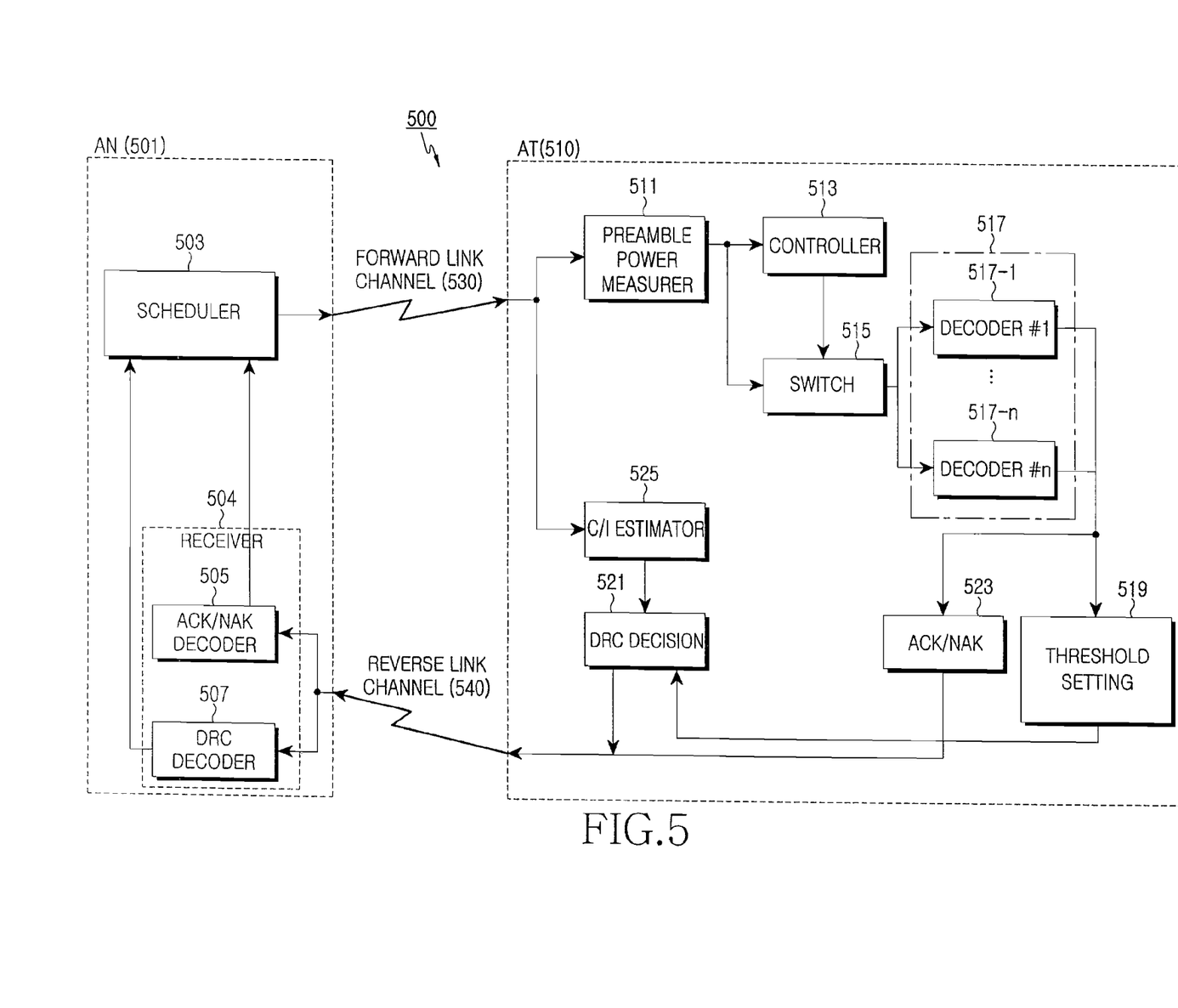
FIG. 5 is a diagram illustrating the connection between an AN and an AT in a CDMA2000 1xEV-DO system according to an exemplary embodiment of the present invention.

FIG. 5 is a diagram illustrating the architecture of a CDMA2000 1xEV-DO system 500 according to an exemplary embodiment of the present invention, wherein an access network (AN) 501 represents a base station and an access terminal (AT) 510 represents a mobile station.

Referring to FIG. 5, the CDMA2000 1xEV-DO system 500 according to an exemplary embodiment of the present invention includes an AN 501 and an AT 510. The AN 501 receives a feedback signal including an Acknowledgement/Negative Acknowledgement (ACK/NAK) signal indicating a necessity/non-necessity of retransmission, and a data rate control (DRC) value, from the AT 510 through a reverse link channel 540, and performs scheduling based on the feedback signal. For this purpose, a receiver 504 includes an ACK/NAK decoder 505 for decoding an ACK/NAK value indicating success/failure in receiving data transmitted from the AT 510, and a DRC decoder 507 for decoding a DRC value associated with a possible data rate of the AT 510. A scheduler 503 determines a data rate and a packet size for each AT based on the feedback signal received at the receiver 504, and based thereon, determines allocation order of forward resources.

The AT 510 receives Multi-User Packet data from the AN 501 using a forward link channel 530. The Multi-User Packet data includes information on a transport format of data in a preamble thereof. A preamble power measurer 511 measures power of a preamble of the received Multi-User Packet data, and a controller 513 compares the measured power of the preamble with a predetermined reference value, since there is a high preamble error probability when the power of the preamble of the received data is lower than a certain reference value. If the preamble value of the received data is lower than the reference value, the controller 513 transmits a control signal for controlling a switch unit 515.

The AT 510 includes a plurality of decoders 517 depending on format information of Multi-User Packet data to decode the received Multi-User Packet data. The number of decoders 517 depends upon the number of decoding types of Multi-User Packet, that is, decoding types based on data rates and the number of transmissions. The number of decoding types is determined according to transport formats of Multi-User Packet data defined in 3GPP2.

The decoder 517 can determine decoding success/failure for the received Multi-User Packet data because the received data has a cyclic redundancy code (CRC) value therein. In addition, because the Multi-User Packet data has an ID for each user, the AT 510 receives the data allocated thereto, after decoding. Further, the decoder 517 transmits packet error information to a threshold setting unit 519.

The switch unit 515 selects a decoder for decoding the received Multi-User Packet data according to a control signal provided from the controller 513. For example, after analyzing a preamble of the Multi-User Packet data, the controller 513 selects a predetermined decoder from the plurality of decoders 517. However, if the AT 510 cannot decode the received Multi-User Packet data due to its failure to analyze the preamble, the controller 513 performs switching in such a manner that the data may be transmitted to all of the decoders 517. As a result, even though the AT 510 is unaware of a decoding type of the received data, the AT 510 can perform decoding by simultaneously performing decoding for all transport formats.

An ACK/NAK unit 523 transmits information indicating decoding success/failure for the received data to the AN 501 through a reverse channel. For example, the ACK/NAK unit 523 transmits ACK when any one of the decoders 517 succeeds in decoding the received data. However, the ACK/NAK unit 523 transmits NAK when all of the decoders 517 fail in the decoding.

The threshold setting unit 519 receives the packet error information provided from the decoder 517, determines a specific threshold value capable of satisfying a target Packet Error Rate (PER) of 1% using the packet error information, and provides the determined threshold information to a DRC decision unit 521. The DRC decision unit 521 receives a carrier-to-interface ratio (C/I) value from a C/I estimator 525 and a threshold value from the threshold setting unit 519 to determine a DRC value to be provided to the AN 501. Thereafter, the DRC decision unit 521 determines a DRC value, and transmits the determined DRC value to the AN 501. A process of determining the DRC value is well known in the art, so a description thereof will be omitted for clarity and conciseness.

In the system according to an exemplary embodiment of the present invention, the preamble power estimator 511 measures received power of Multi-User Packet data, and the controller 513 enables all of the decoders 517, if the measured power is lower than the reference value. However, in an exemplary embodiment of the present invention, the AT 510 may enable all of the decoders 517 for all received data without measuring power of a preamble of the received data.

Figure 6:
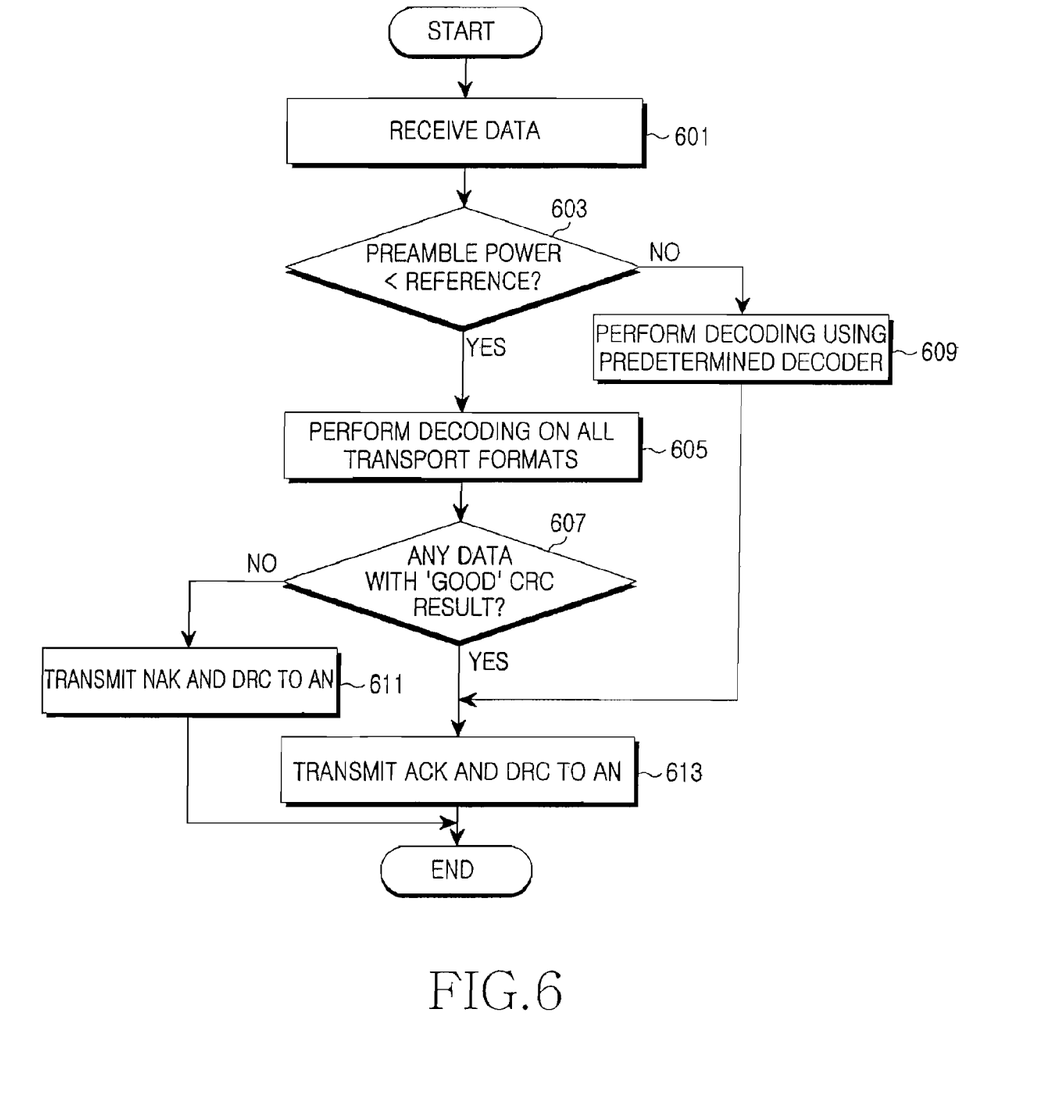
FIG. 6 is a flowchart illustrating a data reception method according to an exemplary embodiment of the present invention.

With reference to FIG. 6, a description will now be made of a method for receiving Multi-User Packet data in the CDMA2000 1xEV-DO system 500 according to an exemplary embodiment of the present invention. The system measures preamble power, by way of example.

Referring to FIG. 6, in step 601, upon receiving Multi-User Packet data from an AN 501, an AT 510 determines in step 603 whether a power value of a preamble of the received data is lower than a specific reference value. If the power value of the preamble is higher than or equal to the reference value, the AT 510 performs decoding using a predetermined corresponding decoder in step 609, as it detects the preamble. However, if the power value of the preamble is lower than the reference value, the AT 510 enables all decoders 517 in step 605 to simultaneously perform decoding for all transport formats. Herein, the control on all of the decoders 517 is achieved by the controller 513 through the switch unit 515.

In step 607, each of the decoders 517 decodes the received Multi-User Packet data, and performs CRC test thereon to determine whether there is any packet whose decoding result is 'Good'. If there is any packet with a 'Good' CRC result value among the packets decoded by the decoders 517, the AT 510 continues to process the corresponding packet, determining that the preamble is information indicating the AT 510 itself. Thereafter, the AT 510 transmits ACK and a DRC value indicating a reverse data rate to the AN 501 in step 613. However, if the decoding result is 'Bad' (or failure), the AT 510 transmits NAK and a DRC value to the AN 501 in step 611. A process of transmitting the DRC value is well known in the art, therefore a description thereof will be omitted for clarity and conciseness.

As can be understood from the foregoing description, even though there is a failure in decoding a preamble of received forward Multi-User Packet data, a receiving AT can perform decoding, thereby increasing its forward data transmission quality and increasing efficiency of slots which are forward radio resources. This contributes to an increase in the total system capacity.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile station for a mobile communication system using packet data, the mobile station comprising:
   a preamble power measurer for measuring preamble power of the packet data received from a base station;
   a controller for comparing the measured power received from the preamble power measurer with a threshold, transmitting the packet data to decoders to simultaneously decode the packet data according to all transport formats if the measured power is lower than the threshold; and
   a plurality of decoders for decoding the received packet data according to a control signal from the controller, wherein a number of the decoders depends upon the total number of transport formats for the packet data.

2. The mobile station of claim 1, wherein the decoder performs error check after decoding the packet data.

3. The mobile station of claim 2, wherein the decoder performs error check using a cyclic redundancy code (CRC).

4. The mobile station of claim 2, further comprising:
   a threshold setting unit for setting a target threshold for satisfying a predetermined error criterion depending on error information received from the decoder; and
   a data rate control (DRC) decision unit for determining a DRC value taking into account a target threshold received from the threshold setting unit and a minimum carrier-to-interference ratio (C/I) which is a forward channel environment parameter, and transmitting the determined DRC value to the base station.

5. The mobile station of claim 4, further comprising an acknowledgement and negative acknowledgement (ACK/NAK) unit for generating ACK/NAK information indicating at least one of success and failure in receiving the packet data and transmitting the ACK/NAK information to the base station.

6. The mobile station of claim 1, further comprising a switch unit connected to the decoders for switching a decoding path of the received packet data according to the control signal from the controller.

7. The mobile station of claim 1, wherein the controller is further configured to decode the packet data according to a transport format, if the measured power is higher than or equal to the threshold.

8. A method for receiving packet data by a mobile station in a mobile communication system, the method comprising:
measuring preamble power, via a preamble power measurer, of the packet data and comparing, via a controller, the measured preamble power with a threshold; and
if the measured preamble power is lower than the threshold, simultaneously receiving the packet data via a plurality of decoders and decoding the packet data according to transport formats.

9. The method of claim 8, further comprising performing error check on the decoded packet data.

10. The method of claim 9, further comprising generating acknowledgement and negative acknowledgement (ACK/NAK) information indicating a least one of success and failure in receiving the packet data and a data rate control (DRC) value according to the error check result, and transmitting the ACK/NAK information and the DRC value to the base station, wherein ACK information is generated if the error check result is good, and NAK information is generated if the error check result is bad.

11. The method of claim 9, wherein the error check is performed using a cyclic redundancy code (CRC).

12. The method of claim 8, further comprising performing decoding using at least one of the decoders if the measured preamble power is higher than or equal to the threshold.

* * * * *